US011693554B1

(12) United States Patent
Persson et al.

(10) Patent No.: US 11,693,554 B1
(45) Date of Patent: *Jul. 4, 2023

(54) ACCOUNT SWITCHING

(71) Applicant: Google LLC, Mountain View, CA (US)

(72) Inventors: Erik Viktor Persson, San Francisco, CA (US); Jonathan Lee, Brooklyn, NY (US); Jean-Marc Denis, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/476,638

(22) Filed: Sep. 16, 2021

Related U.S. Application Data

(63) Continuation of application No. 16/740,730, filed on Jan. 13, 2020, now Pat. No. 11,150,801, which is a
(Continued)

(51) Int. Cl.
| | | |
|---|---|---|
| *G06F 3/0481* | (2022.01) | |
| *G06F 3/0482* | (2013.01) | |
| *G06F 3/0484* | (2022.01) | |
| *G06F 3/04883* | (2022.01) | |
| *G06F 3/0488* | (2022.01) | |

(Continued)

(52) U.S. Cl.
CPC ........ *G06F 3/04883* (2013.01); *G06F 3/0482* (2013.01); *G06F 3/0488* (2013.01); *G06F 3/04842* (2013.01); *G06F 3/04845* (2013.01); *G06F 9/4451* (2013.01); *G06F 21/71* (2013.01); *G06F 2203/04802* (2013.01)

(58) Field of Classification Search
None
See application file for complete search history.

(56) References Cited

U.S. PATENT DOCUMENTS

| | | |
|---|---|---|
| D550,227 S | 9/2007 | Sato |
| 7,594,193 B2 | 9/2009 | Thomas |

(Continued)

OTHER PUBLICATIONS

Chalvet et al., GIF-Account, posted at dribbble, posting date Jan. 16, 2014. [online] [site visited Jan. 2, 2018]. Available from Internet <URL: https://dribbble.oom/shots/1380713-GIF-Account>.

(Continued)

*Primary Examiner* — Jordany Nunez
(74) *Attorney, Agent, or Firm* — Botos Churchill IP Law

(57) ABSTRACT

Aspects of the disclosure relate generally to effortlessly switching between user accounts. For example, a user may access an application on their computing device. Within the application the user may have multiple user accounts. The application may display a plurality of indicators that signify each user account associated with that application. In this regard, the user may perform a swiping or tapping motion to select a particular user account to switch to. A transitional stage may take place that changes a first background and details associated with a first user account to a second background and details associated with a second user account. When the transition is complete, the user is able to access and perform functions associated with the second user account. The user may switch to another user account using a similar swiping or tapping motion.

20 Claims, 15 Drawing Sheets

Related U.S. Application Data continuation of application No. 15/837,253, filed on Dec. 11, 2017, now Pat. No. 10,572,120, which is a continuation of application No. 14/598,981, filed on Jan. 16, 2015, now Pat. No. 9,880,717.

(60) Provisional application No. 62/015,664, filed on Jun. 23, 2014.

(51) Int. Cl.
*G06F 3/04845* (2022.01)
*G06F 3/04842* (2022.01)
*G06F 9/445* (2018.01)
*G06F 21/71* (2013.01)

(56) References Cited

U.S. PATENT DOCUMENTS

| | | |
|---|---|---|
| D641,372 S | 7/2011 | Gardner et al. |
| D652,841 S | 1/2012 | Arnold |
| D665,395 S | 8/2012 | Lee et al. |
| 8,271,894 B1 | 9/2012 | Mayers |
| D677,180 S | 3/2013 | Plitkins et al. |
| D687,058 S | 7/2013 | Corcoran et al. |
| D687,059 S | 7/2013 | Bruck et al. |
| D699,257 S | 2/2014 | Yang et al. |
| D706,827 S | 6/2014 | Harre |
| D734,770 S | 7/2015 | Kim et al. |
| D735,751 S | 8/2015 | Hwang et al. |
| D736,239 S | 8/2015 | Maner |
| D737,833 S | 9/2015 | Anzures et al. |
| D739,424 S | 9/2015 | Ku et al. |
| D741,896 S | 10/2015 | Park et al. |
| D742,901 S | 11/2015 | Choi et al. |
| D744,528 S | 12/2015 | Agrawal |
| D745,550 S | 12/2015 | Sanderson |
| 9,268,477 B2 | 2/2016 | Lai et al. |
| D754,717 S | 4/2016 | Li et al. |
| 9,304,668 B2 | 4/2016 | Rezende et al. |
| D757,058 S | 5/2016 | Kai |
| D757,085 S | 5/2016 | Zukerman et al. |
| D758,403 S | 6/2016 | Lee et al. |
| D758,422 S | 6/2016 | Zhao |
| D759,682 S | 6/2016 | Myung et al. |
| D760,732 S | 7/2016 | Sakai et al. |
| D760,769 S | 7/2016 | Ishii |
| D760,770 S | 7/2016 | Zhu |
| D760,773 S | 7/2016 | Cho |
| D761,303 S | 7/2016 | Nelson et al. |
| D762,655 S | 8/2016 | Kai |
| D763,279 S | 8/2016 | Jou |
| D763,306 S | 8/2016 | Lee et al. |
| D764,520 S | 8/2016 | Lee et al. |
| D765,099 S | 8/2016 | Kim et al. |
| D765,100 S | 8/2016 | Kim et al. |
| D765,102 S | 8/2016 | Lee et al. |
| D765,720 S | 9/2016 | Joo et al. |
| D767,629 S | 9/2016 | Gupta et al. |
| D769,929 S | 10/2016 | Kim et al. |
| D769,930 S | 10/2016 | Agrawal |
| D773,502 S | 12/2016 | Park et al. |
| D776,674 S | 1/2017 | Raykovich et al. |
| D777,768 S | 1/2017 | Persson et al. |
| D778,295 S | 2/2017 | Wang et al. |
| D778,311 S | 2/2017 | Denis et al. |
| D778,312 S | 2/2017 | Goodwin et al. |
| D782,521 S | 3/2017 | Pilch |
| D788,138 S | 5/2017 | Lee et al. |
| D789,960 S | 6/2017 | Alonso Ruiz et al. |
| D792,438 S | 7/2017 | Kim et al. |
| D792,444 S | 7/2017 | Cho et al. |
| D794,670 S | 8/2017 | Lee et al. |
| D795,892 S | 8/2017 | Kim et al. |
| D801,362 S | 10/2017 | Wang et al. |
| D801,382 S | 10/2017 | Seo et al. |
| D801,384 S | 10/2017 | Jeon et al. |
| D802,607 S | 11/2017 | Apodaca et al. |
| D803,850 S | 11/2017 | Chang et al. |
| D806,742 S | 1/2018 | Choi et al. |
| D806,743 S | 1/2018 | Choi et al. |
| D807,899 S | 1/2018 | Hilhorst et al. |
| D807,912 S | 1/2018 | Kim et al. |
| D808,998 S | 1/2018 | Wu et al. |
| 10,154,316 B2 * | 12/2018 | Zhao .................. H04N 21/4415 |
| 10,783,576 B1 * | 9/2020 | Van Os ................ G06F 21/604 |
| 10,990,951 B2 | 4/2021 | Bishnoi et al. |
| 11,409,412 B1 * | 8/2022 | Ho ...................... G01C 21/3664 |
| 2004/0054646 A1 | 3/2004 | Daniell et al. |
| 2007/0035513 A1 | 2/2007 | Sherrard et al. |
| 2007/0189737 A1 | 8/2007 | Chaudhri et al. |
| 2008/0165136 A1 | 7/2008 | Christie et al. |
| 2009/0228562 A1 | 9/2009 | Uchiyama et al. |
| 2010/0088634 A1 | 4/2010 | Tsuruta et al. |
| 2010/0095240 A1 | 4/2010 | Shiplacoff et al. |
| 2010/0185989 A1 | 7/2010 | Shiplacoff et al. |
| 2011/0022982 A1 | 1/2011 | Takaoka et al. |
| 2011/0035691 A1 | 2/2011 | Kim |
| 2011/0225545 A1 | 9/2011 | Horodezky et al. |
| 2011/0271192 A1 | 11/2011 | Jones et al. |
| 2011/0271207 A1 | 11/2011 | Jones et al. |
| 2012/0096396 A1 | 4/2012 | Ording et al. |
| 2012/0124475 A1 | 5/2012 | Foote et al. |
| 2012/0157165 A1 * | 6/2012 | Kim .................... G06F 21/6218 |
| | | 455/566 |
| 2012/0226978 A1 | 9/2012 | Harberts et al. |
| 2013/0027613 A1 * | 1/2013 | Kim .................... H04N 21/4316 |
| | | 348/563 |
| 2013/0145144 A1 | 6/2013 | Newell et al. |
| 2013/0198680 A1 | 8/2013 | Schwend et al. |
| 2014/0109024 A1 | 4/2014 | Miyazaki |
| 2014/0125856 A1 | 5/2014 | Kim et al. |
| 2014/0152591 A1 * | 6/2014 | Odakura ............. G06F 3/04883 |
| | | 345/173 |
| 2014/0237378 A1 | 8/2014 | Gonen et al. |
| 2014/0282208 A1 | 9/2014 | Chaudhri |
| 2014/0298253 A1 | 10/2014 | Jin et al. |
| 2014/0365912 A1 | 12/2014 | Shaw |
| 2014/0365971 A1 | 12/2014 | Laadan et al. |
| 2015/0067596 A1 | 3/2015 | Brown et al. |
| 2015/0186017 A1 | 7/2015 | Lee |
| 2015/0186156 A1 | 7/2015 | Brown et al. |
| 2015/0188720 A1 | 7/2015 | Winter |
| 2015/0215739 A1 | 7/2015 | Lee |
| 2015/0223308 A1 | 8/2015 | Yen |
| 2015/0309689 A1 | 10/2015 | Jin et al. |
| 2015/0341752 A1 | 11/2015 | Flynn |
| 2017/0123638 A1 | 5/2017 | Yamada et al. |
| 2017/0251268 A1 * | 8/2017 | Zhao .................. H04N 21/4667 |
| 2017/0295278 A1 | 10/2017 | Lyren et al. |
| 2017/0300122 A1 | 10/2017 | Kramer et al. |
| 2017/0359506 A1 | 12/2017 | Manzari et al. |
| 2020/0186648 A1 | 6/2020 | Schwarz et al. |
| 2021/0042025 A1 | 2/2021 | Haggerty et al. |

OTHER PUBLICATIONS

Gadget Hacks, Enable Multiple User Accounts on Any Android Phone, posted at You Tube, posting date Aug. 22, 2014. online] [site visited Jan. 2, 2018]. Available from Internet <URL: https://www.youtube.com/watch?v=TpapOCHbLko>.

Google, The Gmail app for Android, posted at YouTube, posting date Nov. 4, 2014, © 2016 YouTube, LLC. (online], [site visited Jan. 8, 2016]. Available from Internet, <URL: https:/twww.youtube.com/watch?v=egjApkX8slk>.

Hoffman, Share Your Android Tablet, posted at How to Geek, posting date Aug. 13, 2013. [online] [site visited Jan. 2, 2018] Available from Internet <URL: https://howtogeek.com/170191/share-your-android-tablet-and-keep-your-privacy-With-a-guest-account/>.

How to use the fast user switching featuring in Windows XP, Last Review: Mar. 27, 2007, <http://support.microsoft.com/kb/279765>, 2 pages.

(56) References Cited

OTHER PUBLICATIONS

Kilic, Sidebar Menu, posted at dribbble, posting date Jul. 30, 2013. [online] [site visited Jan. 2, 2018]. Available from Internet <URL:https://dribbble.com/shotes/1175816>.
Mac OS X 10.6: quickly switching between accounts, <http://support.apple.com/kb/PH6983>, Last Modified: Nov. B. 2013, 2 pages.
Kondrat, Tomek, Gmail 5.0: Material Design & Multiple Account Support, posted at xda-developers, posted date~0 20, 2014, © xda-developers. [online], [site visited Jan. 8, 2016]. Available from Internet, <URL:http://www.xdadevelopers.com/gmail50materialdesignmultipleaccounts/>.

* cited by examiner

900

1500

ACCOUNT SWITCHING

CROSS-REFERENCE TO RELATED APPLICATIONS

The present application is a continuation of U.S. patent application Ser. No. 16/740,730 filed Jan. 13, 2020, which is a continuation of U.S. patent application Ser. No. 15/837,253 filed Dec. 11, 2017, now issued as U.S. Pat. No. 10,572,120 on Feb. 25, 2020, which is a continuation of U.S. patent application Ser. No. 14/598,981, filed Jan. 16, 2015, now issued as U.S. Pat. No. 9,880,717 on Jan. 30, 2018, which claims the benefit of the filing date of U.S. Provisional Patent Application No. 62/015,664, filed Jun. 23, 2014, the entire disclosures of which are hereby incorporated herein by reference.

BACKGROUND

Users are able to access a plurality of applications on their computing devices. In addition, a user may be able to create multiple user accounts with many of these applications. In this regard, the user may have different purposes for each user account and for each application. Switching user accounts may require the user to log out of a particular account, and then log in to another account by typing in the necessary credentials, such as a username and password. This can be time consuming and cumbersome, especially when using handheld communication devices such as mobile phones.

SUMMARY

A system and method for quickly and effortlessly switching between user accounts in an application are provided. A user may have multiple user accounts associated with his or her computing device. An application running on the device may display an indicator for each user account that the user has with that particular application. In this regard, when a first user account is displayed with a first indicator, the user may swipe the display of their computing device to switch to, for example, a second user account. As another example, the user may tap the second user account indicator to switch to that account. When the second user account is selected, the details and settings associated with that user account may be displayed and replace the details and settings associated with the first user account.

DETAILED DESCRIPTION

Figure 1:
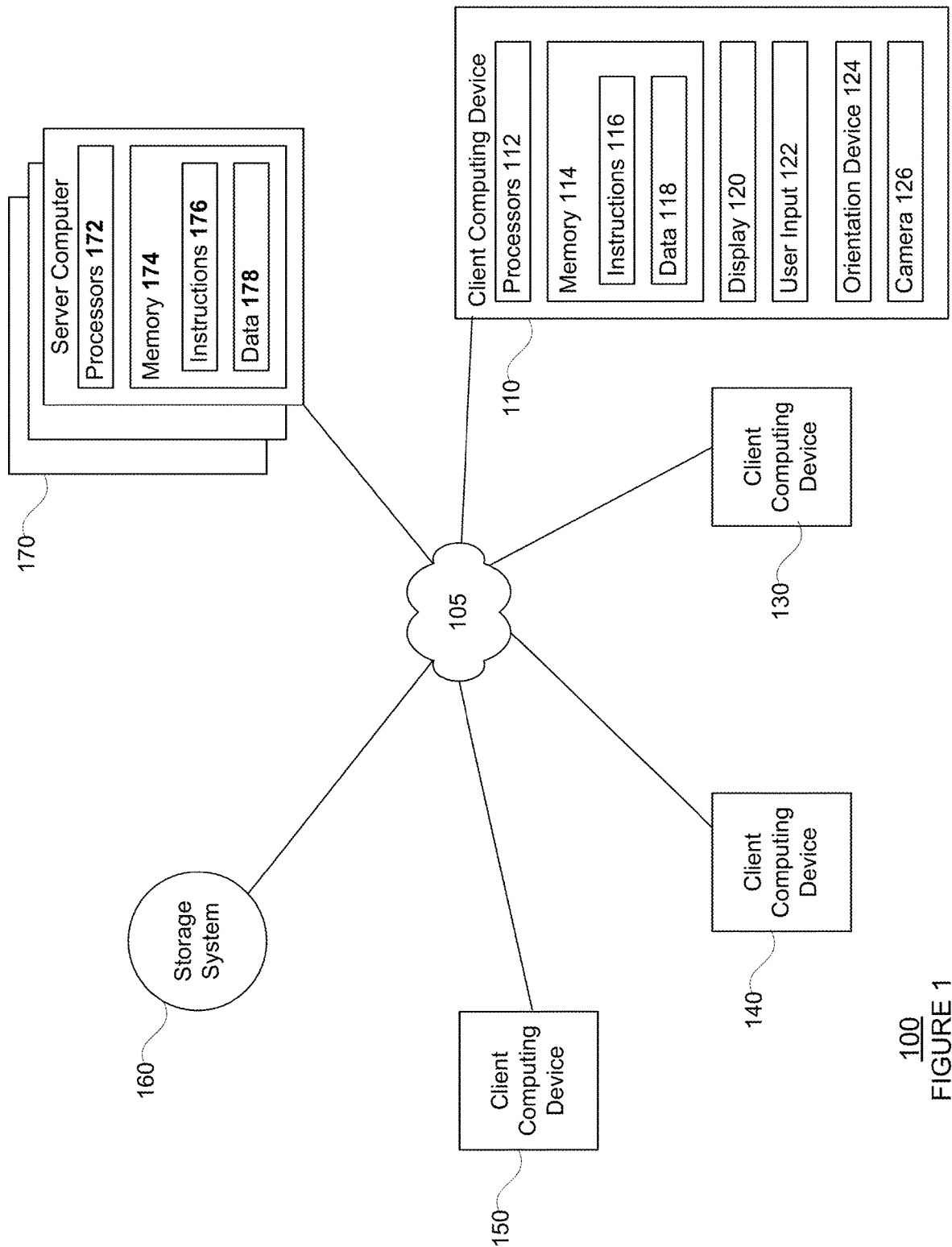
FIG. 1 is a functional diagram of an example system in accordance with aspects of the disclosure.

Aspects of the technology generally pertain to quickly and efficiently switching between user accounts while using a computing device. A user may have more than one user account for a particular application, such as, for example, e-mail. In this regard, to quickly switch between the different user accounts, a user may swipe, using an input mechanism, across the screen. The swipe may be done, for instance, using a cursor of a mouse, a stylus, or the user's finger. The swipe may be done in a predetermined direction, e.g., from left to right, right to left, etc. Upon completion or concurrently with the swipe, the computing device may switch user accounts. For example, prior to the swipe, a user's work e-mail account along with all the details and settings associated therewith may be displayed. After the swipe the user's personal e-mail account along with all of the details and settings associated therewith may be loaded and displayed. In this regard, as a result of the swipe the user can quickly and efficiently switch between user accounts.

While using a computing device, such as a mobile phone, tablet PC or netbook, a user may utilize multiple applications. These applications may include, as some examples, e-mail, text documents, games, mapping applications that provide directions, and cloud storage applications that provide access to stored music, documents, spreadsheets, etc.

As noted above, the user may have more than one account associated with any particular application. For instance, when the user accesses an e-mail application, the user may have more than one e-mail account. The user may have a work e-mail account set up specifically for their occupational communications, and a personal e-mail account set up for their personal communications.

The e-mail application may display each e-mail account associated with the user. For instance, the e-mail application may display indications of each user account. As an example, the indications may be images and/or text that were pre-selected by the user. In addition, each user account may have a theme associated therewith, such as a background, color scheme, sound, etc., that the user may have chosen. The background may be, for example, the sky and clouds for the personal e-mail account, and sky rise buildings or mountains for the work e-mail account.

According to one aspect of the technology, the user is able to switch between the two e-mail accounts within the e-mail application. For instance, the user can swipe across the display of the computing device using an input mechanism. For example, the user may use a mouse to hold a click and then swipe a cursor across the screen. As another example, the user may press their figure on, or hover over, the touch-screen display and swipe in a particular direction.

Performing the swipe function causes the application to switch e-mail accounts. For example, if the user was viewing their work e-mail account prior to the swipe, then after the swipe the personal e-mail account may be displayed instead. Thus, after the swipe the user would be able to check his or her personal e-mail account's inbox, drafts, sent e-mails, etc. In addition, the user may switch back to their work e-mail account using the same swiping function described above.

Figure 2:
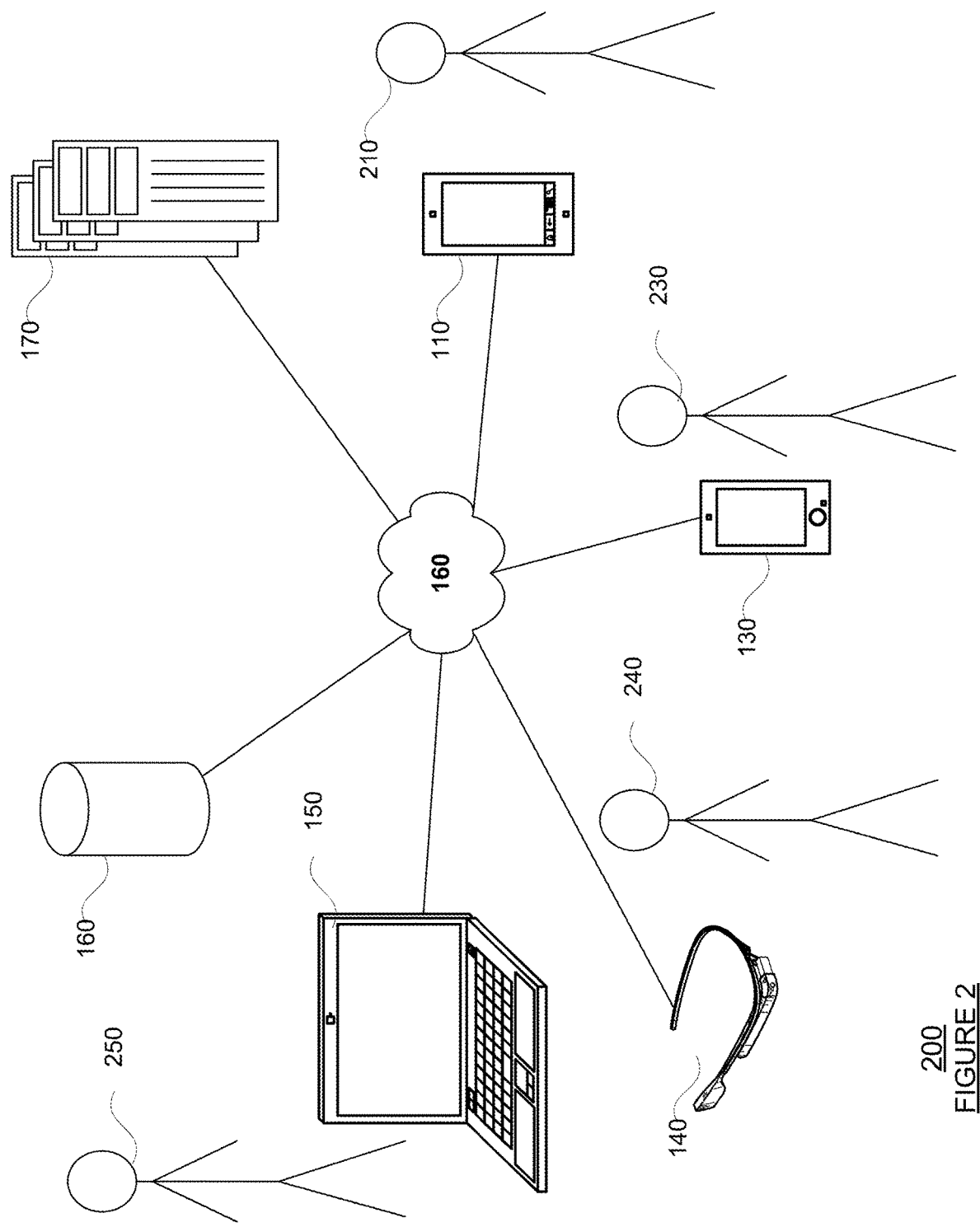
FIG. 2 is a pictorial diagram of the example system of FIG. 1.

FIGS. 1 and 2 illustrate one possible environment in which systems and methods described above may operate, and should not be considered as limiting the scope of the disclosure or usefulness of the features described herein. In this example, system 100 may include computing devices 110, 130, 140, 150, 160 and 170. Computing device 170 may contain a processor 172, memory 174 and other components typically present in general purpose computing devices. Memory 174 of computing device 170 may store information accessible by processor 172, including instructions 176 that may be executed by the processor 172.

Memory 174 may also include data 178 that may be retrieved, manipulated or stored by the processor. The memory may be of any type capable of storing information accessible by the processor, such as a hard-drive, memory card, ROM, RAM, DVD, CD-ROM, write-capable, and read-only memories.

The instructions 176 may be any set of instructions to be executed directly, such as machine code, or indirectly, such as scripts, by the processor. In that regard, the terms "instructions," "application," "steps" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

Data 178 may be retrieved, stored or modified by processor 172 in accordance with the instructions 176. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data.

The processor 172 may be any conventional processor, such as a commercially available CPU. Alternatively, the processor may be a dedicated component such as an ASIC or other hardware-based processor. Although not necessary, computing device 130 may include specialized hardware components to perform specific computing processes, such as encoding, decoding or modifying audio.

The computing device 170 may be at one node of a network 105 and capable of directly and indirectly communicating with other nodes of network 105. Although only a few computing devices are depicted in FIGS. 1 and 2, it should be appreciated that a typical system may include a large number of connected computing devices, with each different computing device being at a different node of the network 105. The network 105 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing device 170 may include a web server that is capable of communicating with storage system 160 as well as computing devices 110, 130, 140, and 150 via the network 105. For example, server computing device 170 may use network 105 to transmit and present information to a user, such as user 210, 230, 240, or 250 on a display of computing devices 110, 130, 140, or 150. In this regard, computing devices 110, 130, 140, and 150 may be considered client computing devices and may perform all or some of the features described herein.

The client computing device 110 may include a processor 112, memory 114, instructions 116, and data 118, all components of which may function similarly the processor 172, memory 174, instructions 176, and data 178 as described above with respect to server computing device 170. In addition, each of the client computing devices may be configured similarly to the client computing device 110, with a processor, memory and instructions, and data as described above. Each client computing device 110, 130, 140, and 150, may be a personal computing device intended for use by user 210, 230, 240, and 250, respectively and as shown in FIG. 2, and have all of the components normally used in connection with a personal computing device such as a central processing unit (CPU), memory storing data and instructions, a display such as display 120 (e.g., a monitor having a screen, a touch-screen, a projector, a television, or other device that is operable to display information), and user input device 122 (e.g., a mouse, keyboard, touch screen, microphone, etc.). The client computing device may also include a camera 126 for recording video streams, speakers, a network interface device, and all of the components used for connecting these elements to one another.

The client computing devices 110, 130, 140, and 150, may each comprise a mobile computing device capable of wirelessly exchanging data with a server over a network such as the Internet. By way of example only, each client computing device may be a mobile phone or a device such as a wireless-enabled PDA, a tablet PC, a wearable computing device or a netbook that is capable of obtaining information via the Internet. As an example, the user may input information using a keyboard, a keypad, a microphone, a touch screen or via visual signals captured by a camera. In another example, one or more of the client computing devices, such as device 150, may be full-sized personal computer.

Client computing devices 110, 130, 140, and 150, may also include a geographic position component (not shown) in communication with the client computing device's processor for determining the geographic location of the device. For example, the position component may include a GPS receiver to determine the device's latitude, longitude and/or altitude position. The client computing device's location may also be determined using one or more localizing techniques, such as cellular tower triangulation, IP address lookup, Wi-Fi SSID lookup (e.g., querying a database that maps Wi-Fi SSIDs to geographic positions), a Wi-Fi positioning system or other techniques, all with various ranges of accuracy.

The client computing devices may also include other devices such as an accelerometer, gyroscope, compass or another orientation detection device 124 to determine the orientation of the client computing device. By way of example only, an acceleration device may determine the client computing device's pitch, yaw or roll (or changes thereto) relative to the direction of gravity or a plane perpendicular thereto. The client computing devices' provision of location and orientation data as set forth herein may be provided automatically to the user, as well as to other computing devices such client device 140 via network 110.

As with memory 174, storage system 160 can be of any type of computerized storage capable of storing information accessible by one or more of server computing devices 110, such as a hard-drive, memory card, ROM, RAM, DVD, CD-ROM, write-capable, and read-only memories. In addition, storage system 160 may include a distributed storage system where data is stored on a plurality of different storage devices which may be physically located at the same or different geographic locations. Storage system 160 may be connected to the computing devices via the network 105 as shown in FIG. 1 and/or may be directly connected or incorporated into any of the computing devices 110-140 (not shown).

Storage system 160 may store information related to any number of applications accessible by computing devices 110, 130, 140, and 150. For instance, storage system 160 may store e-mails associated with a particular user account, such as e-mails from an inbox, deleted e-mails, draft e-mails, or sent e-mails. Alternatively, storage system 160 may be store text documents, spreadsheets, music, etc., which are associated with a particular user account. Previous searches conducted by a user may be stored as well, such as web-based searches in a web browser, or searches in a map application such location searches or direction searches.

Although FIG. 1 functionally illustrates the processor, memory, and other elements of computing device 170 as being within the same block, the processor, computer, computing device, or memory may actually comprise multiple processors, computers, computing devices, or memories that may or may not be stored within the same physical housing. For example, the memory may be a hard drive or other storage media located in a housing different from that of computing device 170. Accordingly, references to a processor, computer, computing device, or memory will be understood to include references to a collection of processors, computers, computing devices, or memories that may or may not operate in parallel. For example, the computing device 170 may include a single server computing device or a load-balanced server farm. Yet further, although some functions described below are indicated as taking place on a single computing device having a single processor, various aspects of the subject matter described herein may be implemented by a plurality of computing devices, for example, communicating information over network 105.

Various aspects of the system are particularly advantageous when used in connection with e-mail applications. While most of the descriptions of the system and method herein focus on user accounts associated with an e-mail application, the system and method may be used in a wide variety of applications that permit multiple user accounts that are associated with settings for a particular user.

Figure 3:
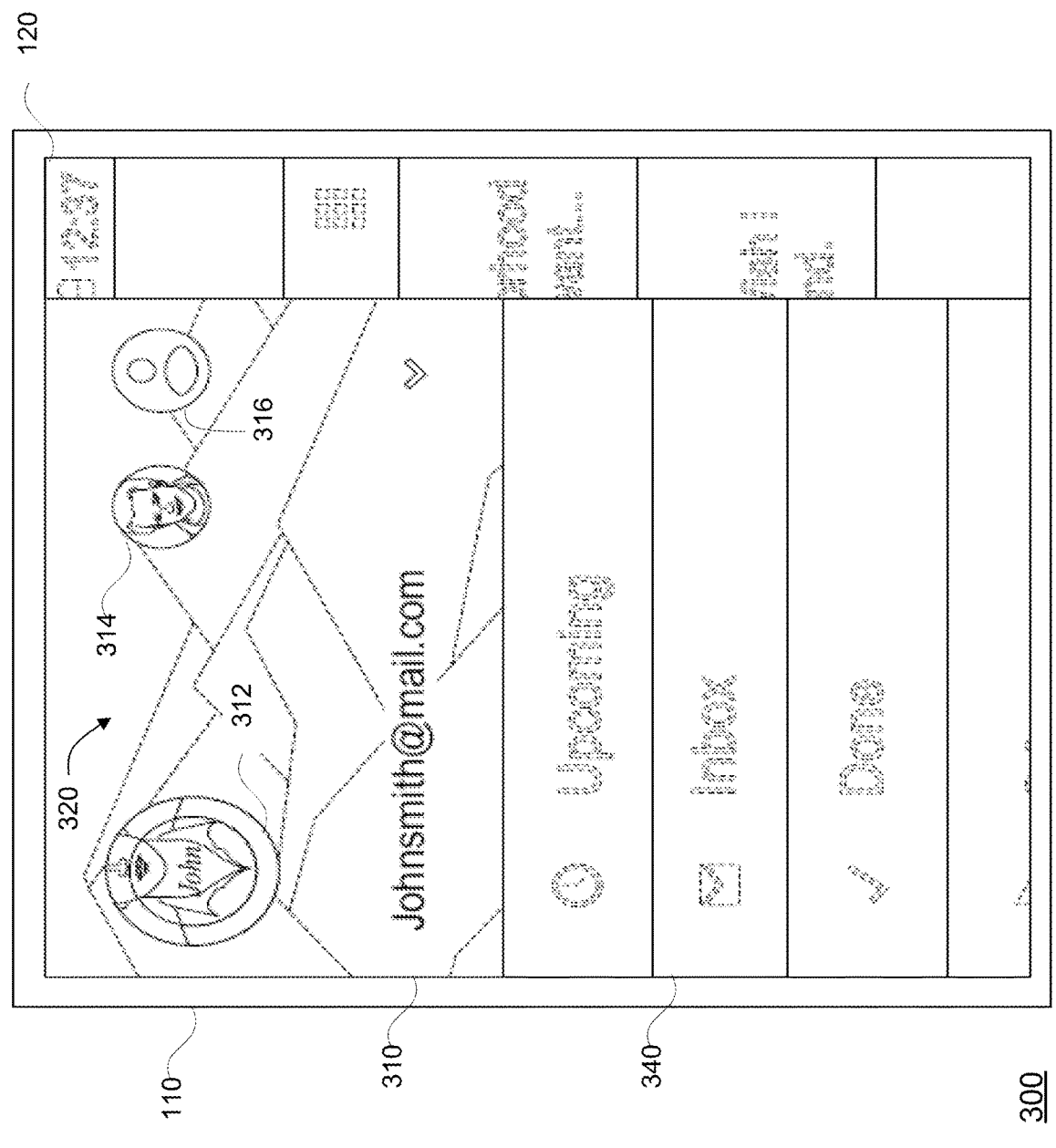
FIG. 3 is an example of a plurality of indicators in accordance with aspects of the disclosure.

In one scenario, a plurality of applications is available to a user while using his or her computing device. For example, while using mobile computing device 110, a user 210 may access e-mail or other productivity applications, games, maps, and cloud storage applications to access documents, spreadsheets or music or other content. As shown in example 300 of FIG. 3, the user may access his or her e-mail application on computing device 110. In this regard, a first e-mail account associated with the e-mail address John.Smith@mail.com is shown on display 120 of computing device 110. As shown in FIG. 3, the user may access various aspects of the e-mail account, such as the inbox. In addition, the user may also access the outbox, trash, and spam folders (not shown) of the application that are associated with the John.Smith@mail.com account.

The e-mail application may have two distinct portions that display different information to the user. For instance, a top portion 310 may contain indicators, such as icons, of the various user accounts associated with the e-mail application. And bottom portion 340 may contain certain features of the e-mail application. For example, the bottom portion 340 of FIG. 3 contains Upcoming, Inbox, and Done links. The Upcoming link may be linked to a calendar to show display to the user upcoming engagements that they have. As mentioned above, the bottom portion may also contain, for example, the trash, spam, and sent items folders. In another example, if a map application was implemented, then the map could be displayed on bottom portion 340, and the user account indicators would be displayed on top portion 310. In another example, if a cloud storage application was accessed then the documents, spreadsheets, music, etc. could be displayed on bottom portion 340.

As mentioned above, the user may have more than one user account associated with the e-mail application. For instance, as shown in example 300 of FIG. 3, three different user accounts are available. The three different user accounts are illustrated by user account indicators 312, 314 and 316 on the top portion 310 of the e-mail application. As one example, each user account may serve a different purpose for the particular user, such as a work e-mail address, personal e-mail address, and an extra or alternative e-mail address. The work e-mail address may be designated for occupational correspondence, the personal e-mail address may be for personal correspondence, and the extra or alternative e-mail address may be for any other purpose, such as hobbies or charity organizations the user may be involved with. In this regard, indicator 312 may be considered the personal e-mail address, indicator 314 may be considered the extra e-mail address, and indicator 316 may be considered the work e-mail address. In another example, any amount of user accounts may be possible, such as 5, 10, or 20 user accounts.

Each indicator may be of an image or text, which may be selected by the user or assigned by the application. For instance, as shown in example 300 of FIG. 3, indicator 312 contains an image of a person with the text "John" displayed over the image. In addition, indicator 314 is only an image of a head of a user, and indicator 316 a stylized representation of a person. As additional examples, the indicators may contain text chosen by the user, such as "work" or "personal" to indicate the type of e-mail address. Sounds or other information may also be associated with the indicators.

As illustrated in example 300 of FIG. 3, the user account associated with indicator 312 also has a background 320 associated with that indicator. Background 320 may have been automatically given to the user, chosen by the user from among certain preset options, or personally designed by the user. In this example, background 320 contains a mountainous landscape. In addition, indicators 314 and 316 may also have particular backgrounds associated with those user accounts as well. The backgrounds may be the same or different for the various user accounts.

The user may decide to switch between the different user accounts. In this regard, the user may perform a swiping action on the top portion 310 of the e-mail application of computing device 110. The swipe may be performed using an input mechanism, such as, for example, a cursor of a mouse, a stylus, or a finger across a touch screen display. By way of example only, the user may swipe their finger across the screen in a given direction. The user swipe may be in a predetermined direction, e.g., horizontally, vertically, or diagonally.

Figure 4:
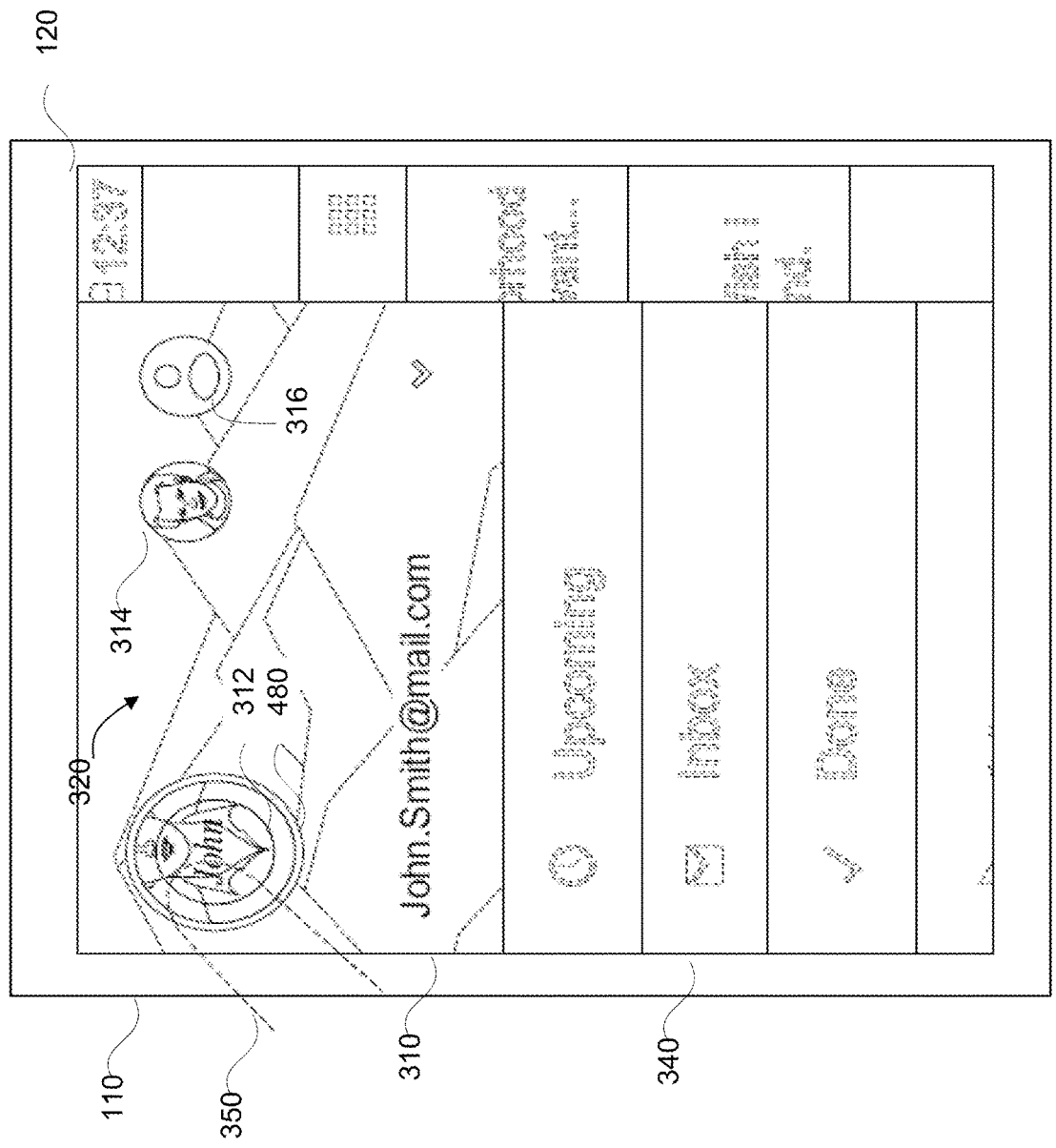
FIG. 4 illustrates a touch spot in accordance with aspects of the disclosure.

As shown in example 400 of FIG. 4, a touch spot or area 480 is shown where the user's finger 350 touches (or hovers over) the display 120 to perform the swipe. In this example, the touch spot 480 is positioned around indicator 312 because that is where the finger 350 touches the display 120. Other sizes and/or locations of the touch spot 480 are possible. When performing the swipe, however, the finger 350 may touch (or hover over) anywhere in top portion 310 of the application. As shown in example 400 of FIG. 4, the finger touches on indicator 312. However, the finger may also touch anywhere on background 320. In another example, if a mouse is used then the user may hold a click while the cursor is positioned over the top portion 310, and drag the cursor in one of the directions described above.

Figure 5:
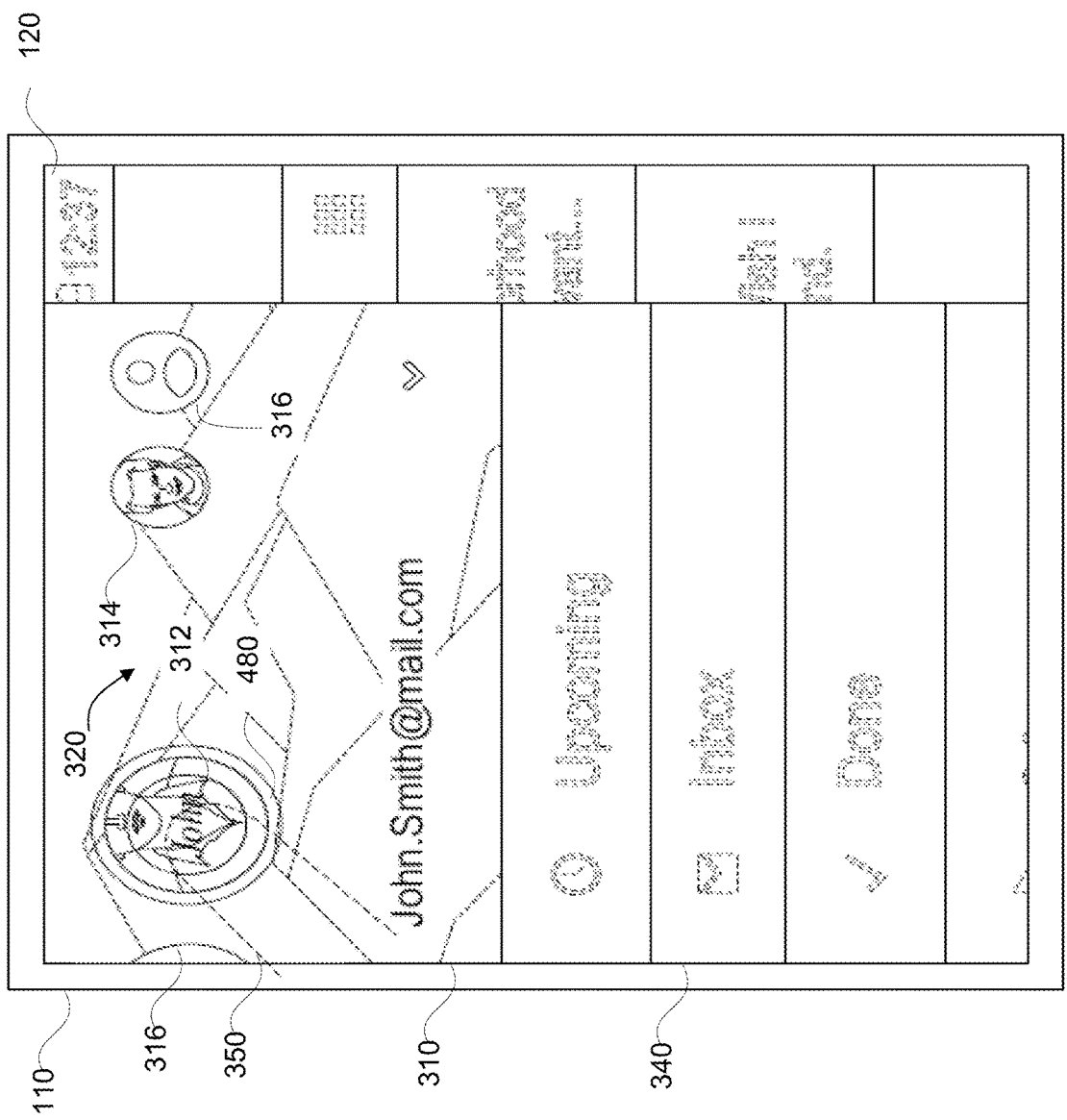
FIG. 5 illustrates the beginning of a swipe in accordance with aspects of the disclosure.

Example 500 of FIG. 5 shows an example of a swiping motion of the user's finger across display 120. For example, finger 350, indicator 312, and touch spot 480 have moved slightly to the right as compared to FIG. 4, and the indicator 316 is beginning to show on the left side of the display. In this regard, the swiping motion causes the indicators to rotate in a carousel-like manner. The carousel rotation may be in a clockwise or counterclockwise manner.

Concurrently, or after the user performs the swiping motion, a transitional stage of switching between user accounts takes place. For instance, as already discussed above with respect to FIG. 5, indicator 316 begins to move in the carousel motion. As shown in example 600 of FIG. 6, indicators 312, 314, and 316 continue to move in accordance with the user's swipe. In this figure, background 622 depicts a transitional stage of the background. In this respect, the background is transitioning from the background associated with indicator 312 to the background associated with indicator 316. In this example, the mountainous background associated with indicator 312 is fading away as a sky and cloud background associated with indicator 316 begins to appear. Thus, the transitional background 622 may illustrate the fading away of the previous background, and the gradual development of the new background. As another example, the previous background may move off the screen as the user swipes, and the new background may appear on the screen. Alternatively, the new background may start off as a black and white image, and then gradually saturate itself with color. And the reverse may occur with the previous background.

Figure 6:
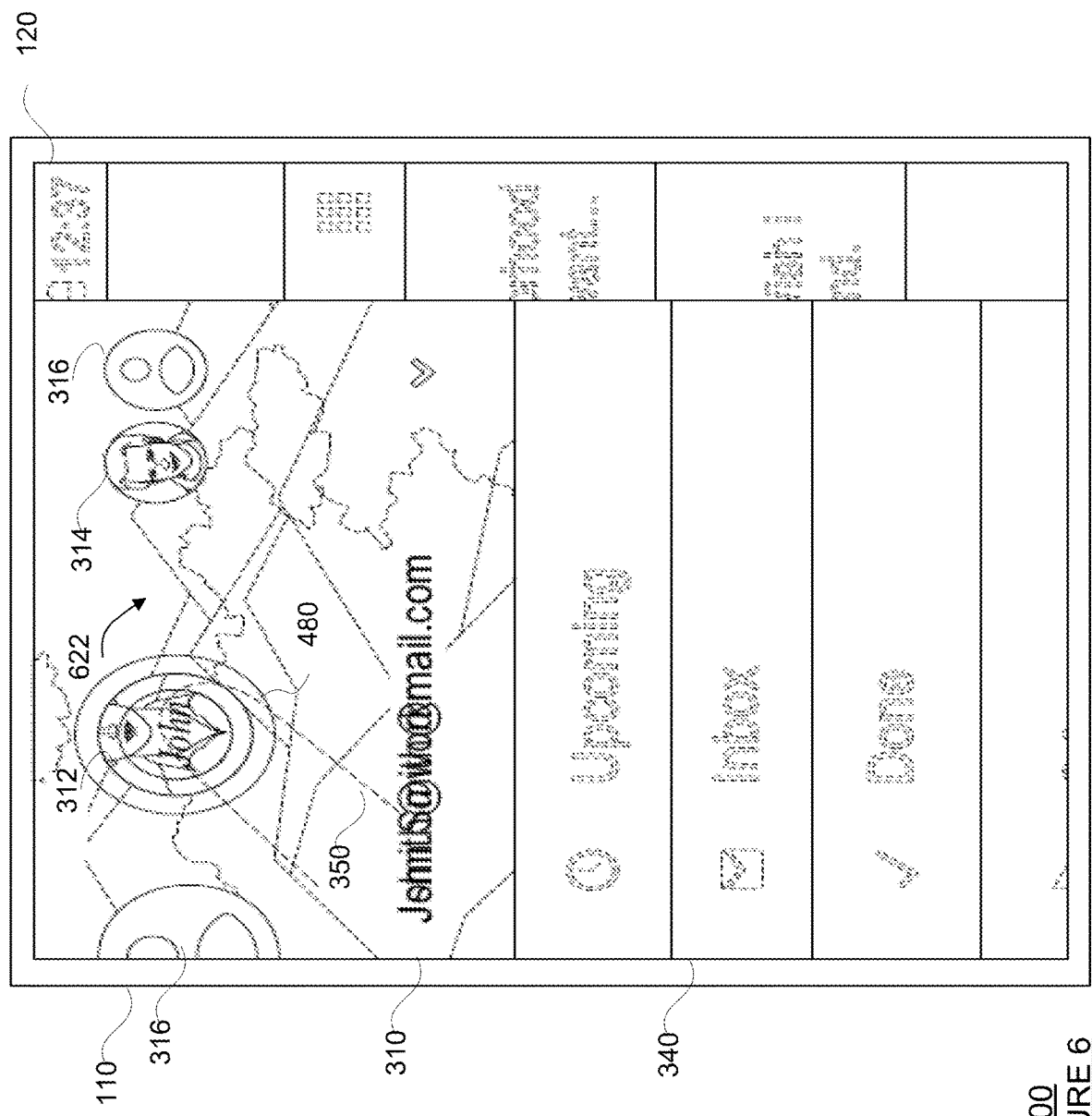
FIG. 6 is an example of a transitional stage in accordance with aspects of the disclosure.

In addition to the transition of the background, the e-mail address (or other account) transitions as well. For instance, as shown in FIG. 6 the new e-mail address associated with indicator 316 is beginning to appear directly over the e-mail address associated with indicator 312. Furthermore, indicator 316 on the left side of the screen is almost entirely shown, thereby replacing indicator 312 in a main position. The main position may indicate, for example, which user account information is currently being displayed among the plurality of indicators. Thus, the user account information associated with indicator 312 was previously displayed, and now the information associated with indicator 316 is transitioning in. In another example, although indicator 316 is displayed in two locations, the indicator on the right side of display 120 may be gradually fading away. For instance, the transition may occur so quickly that the user does not even realize that indicator 316 is in two locations at once. Thus, the appearance of two indicators for indicator 316 is simply displayed to portray the carousel motion. In one example, these types of transitions may occur within a few seconds or less. Alternatively, the transitions may take no more than 0.25 to 0.75 seconds.

Figure 7:
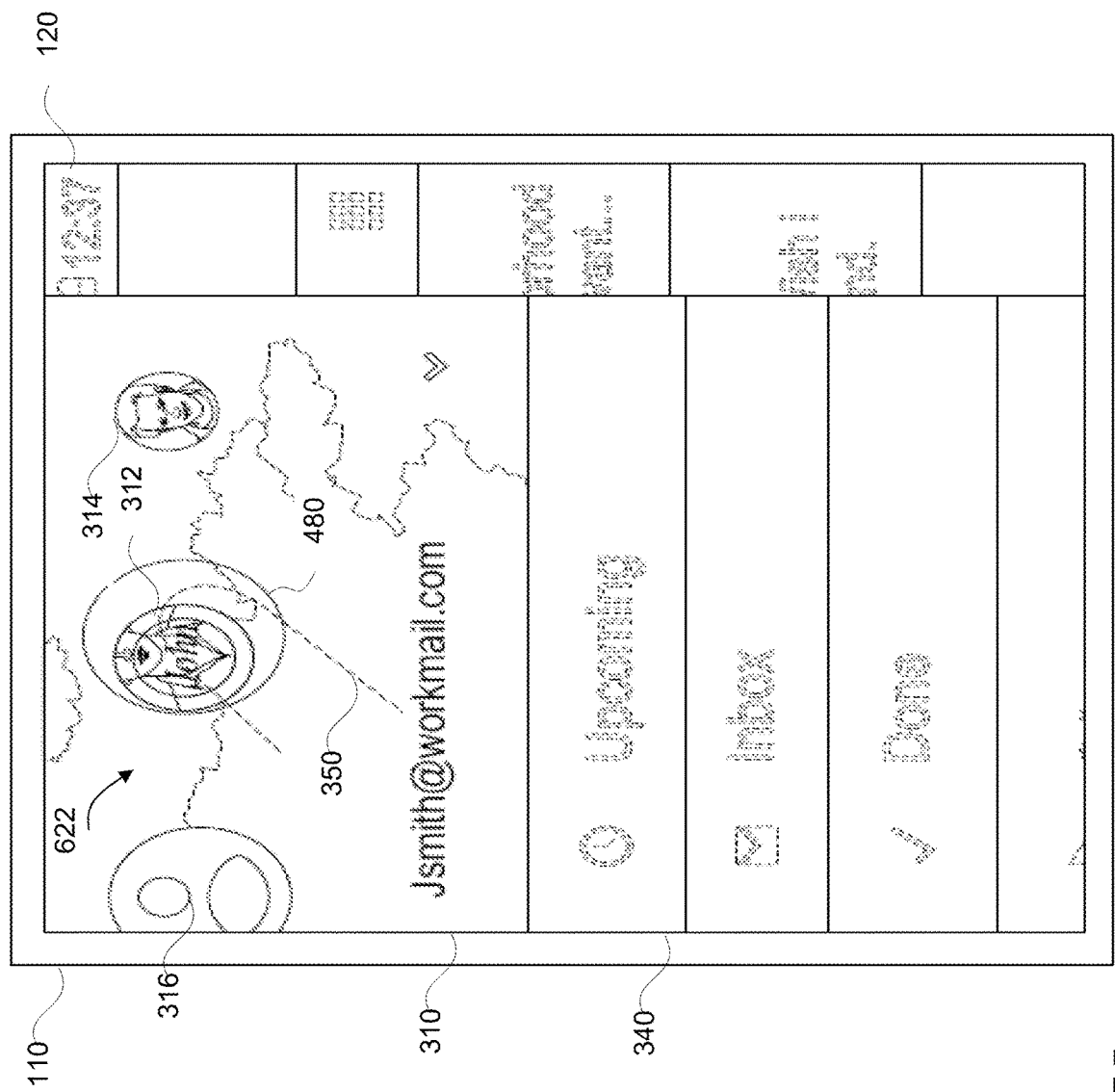
FIG. 7 illustrates an almost completed transitional stage in accordance with aspects of the disclosure.
Figure 8:
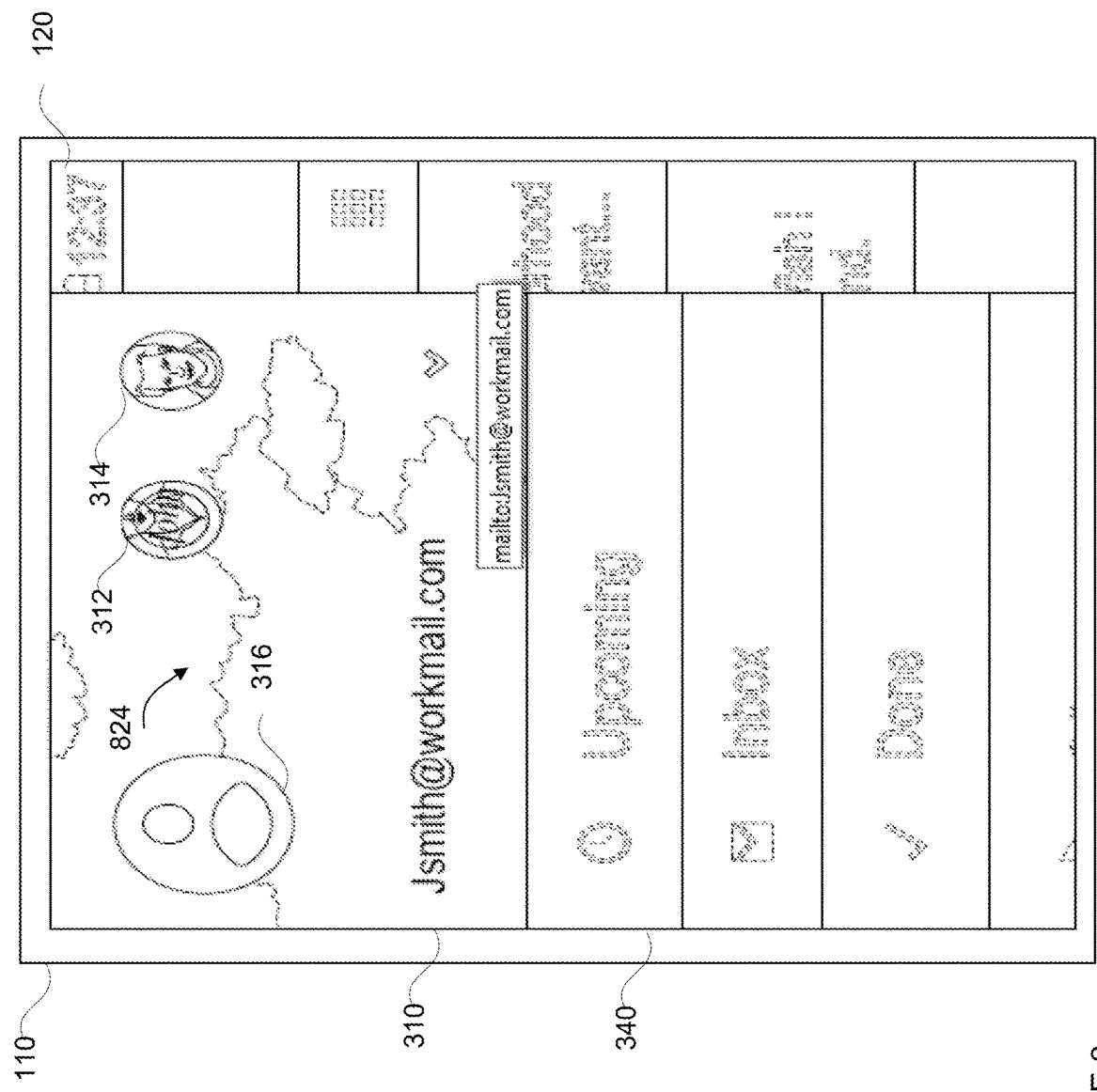
FIG. 8 illustrates a completed transition of user accounts in accordance with aspects of the disclosure.

Examples 700 and 800 of FIGS. 7 and 8 respectively illustrate the completing stages of the transitional stage. For example, in FIG. 7 indicator 316 is almost entirely displayed on the left side of the display 120, and has entirely disappeared from the right side of the display 120. Indicators 312 and 314 have also shifted positions in the carousel motion as well and have almost reached their positions. Specifically and as shown in FIG. 8, indicator 316 takes the original position of indicator 312, indicator 314 takes the original position of indicator 316, and indicator 312 takes the original position of indicator 314. Alternatively, the various indicators may take different positions on the upper half of the application interface. In FIG. 7, transition background 622 is also almost complete in that the background associated with indicator 312 is entirely gone, and the background associated with indicator 316 is almost entirely loaded. In another example, the e-mail address associated with indicator 316 has also loaded. Specifically, as shown in FIGS. 7 and 8, the e-mail address JSmith@workmail.com is now displayed and the John.Smith@mail.com e-mail address is no longer visible. Finally, the touch spot 480 is shown in FIG. 7, but disappears in FIG. 8 because the user's finger 350 is no longer touching (or hovering over) the display.

When the transitional stage is complete, the details and information associated with another user account are presented in the e-mail application. In this regard, the user account associated with indicator 316 is displayed because indicator 316 has taken the main position. As already discussed above, the main position signifies to the user which user account details and information are currently being displayed. For instance, the e-mail address JSmith@workmail.com that has loaded is associated with indicator 316.

In addition, the information contained in the bottom portion 340 is associated with the user account that is associated with indicator 316, and not indicator 312. Thus, the upcoming and inbox links in bottom portion 340 may present the user with information associated with indicator 316 only. E-mail folders such as trash, spam, and sent (not shown) may only display e-mails and other information associated with the user account of indicator 316. Furthermore, background 824 is the fully loaded background associated with indicator 316. In this example, background 824 is a sky and cloud design, but it may be any background that is given to the user, chosen by the user, or created by the user. It should be understood that any position on the screen may be considered the main position that indicates which details of the respective indicators are displayed.

Figure 9:
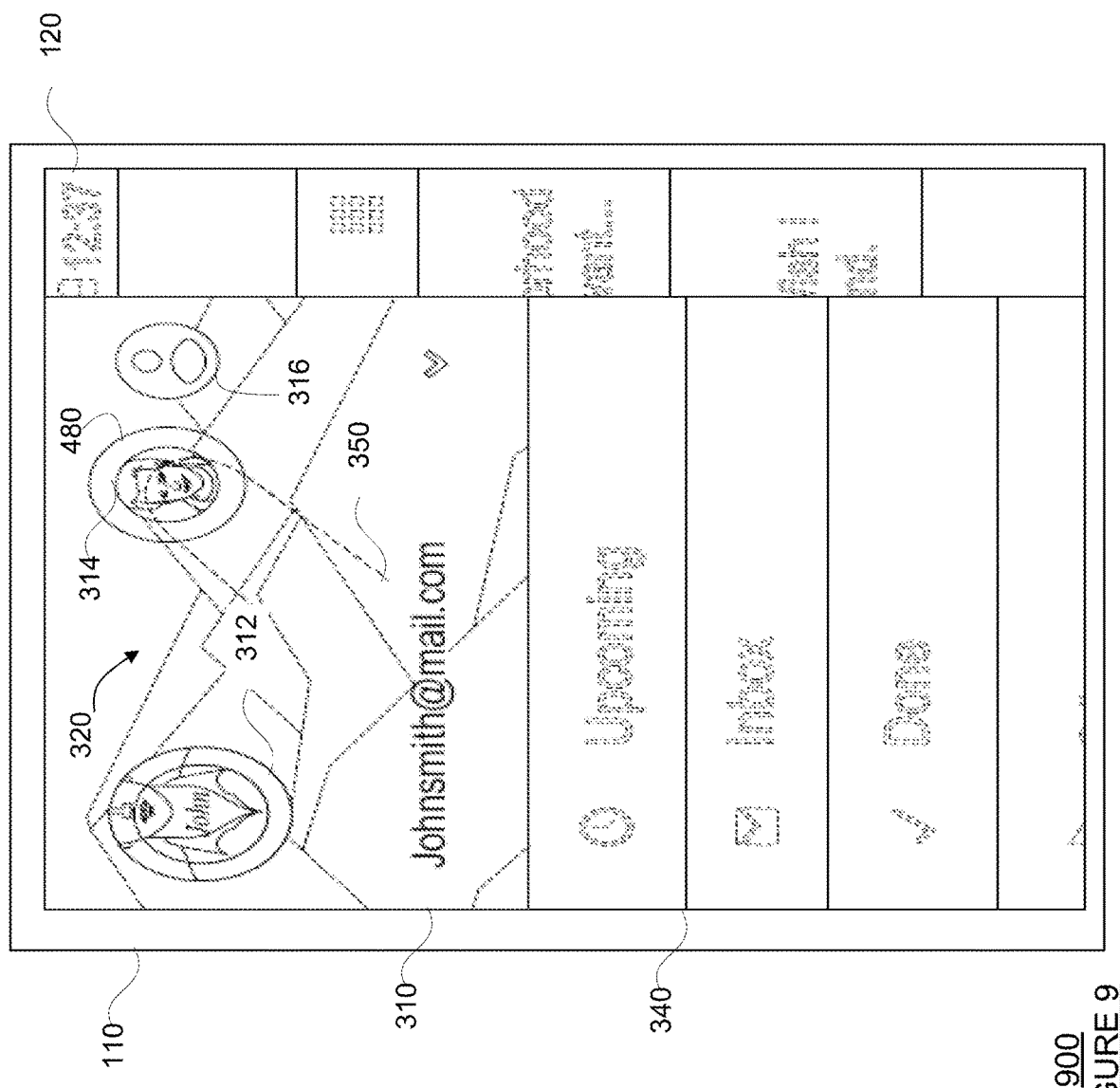
FIG. 9 illustrates a tap of an indicator in accordance with aspects of the disclosure.

As an alternative to switching user accounts by swiping, a user may tap a particular indicator to switch accounts. For instance, referring to example 900 of FIG. 9, the user may tap on indicator 314 to select that user account. Similar to the swiping motion, touch spot 480 appears over the location on the display where the user touched. Thus, in FIG. 9 the touch spot 480 shows over indicator 314.

Figure 10:
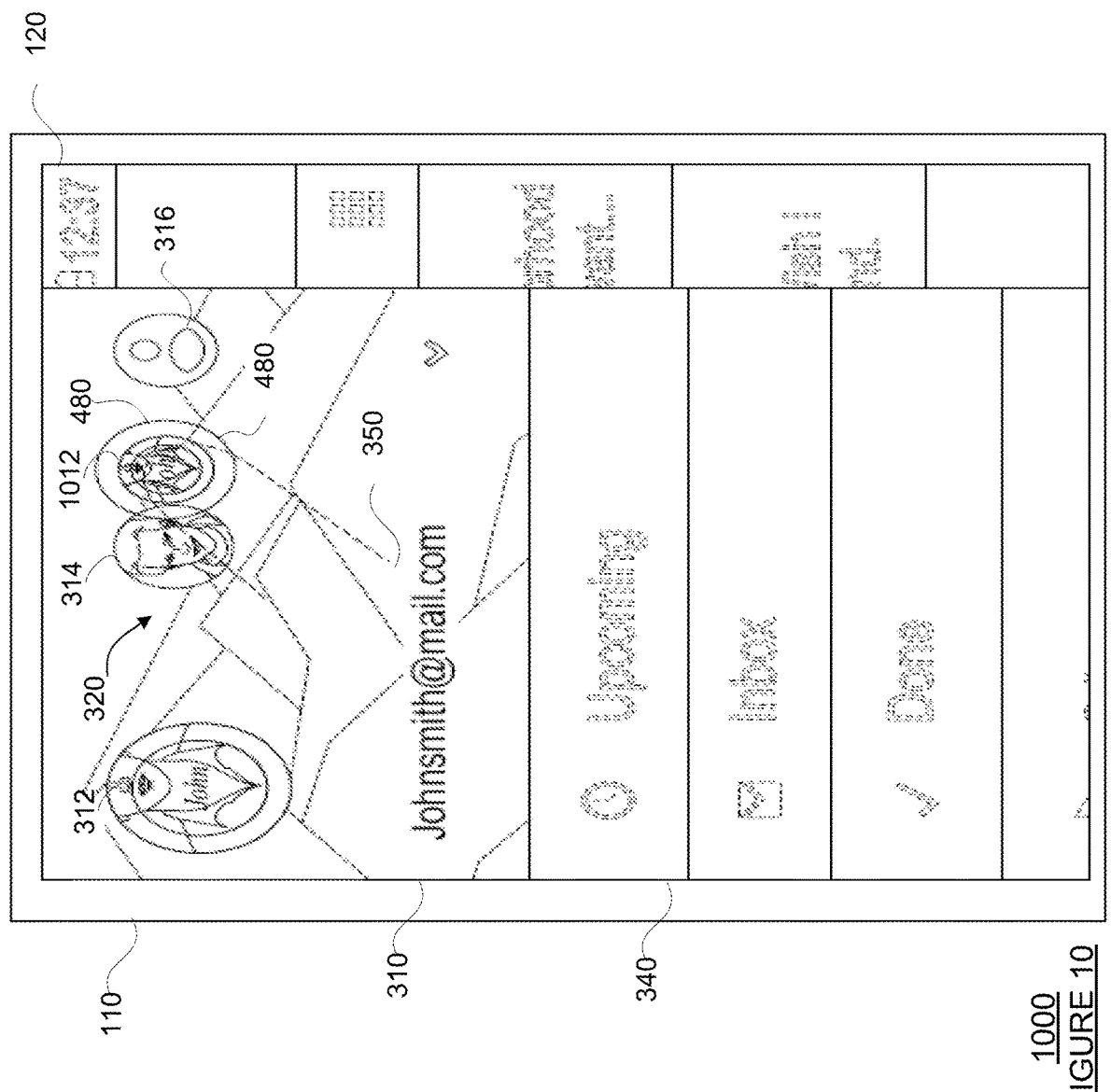
FIG. 10 illustrates the beginning of switching user accounts in accordance with aspects of the disclosure.
Figure 11:
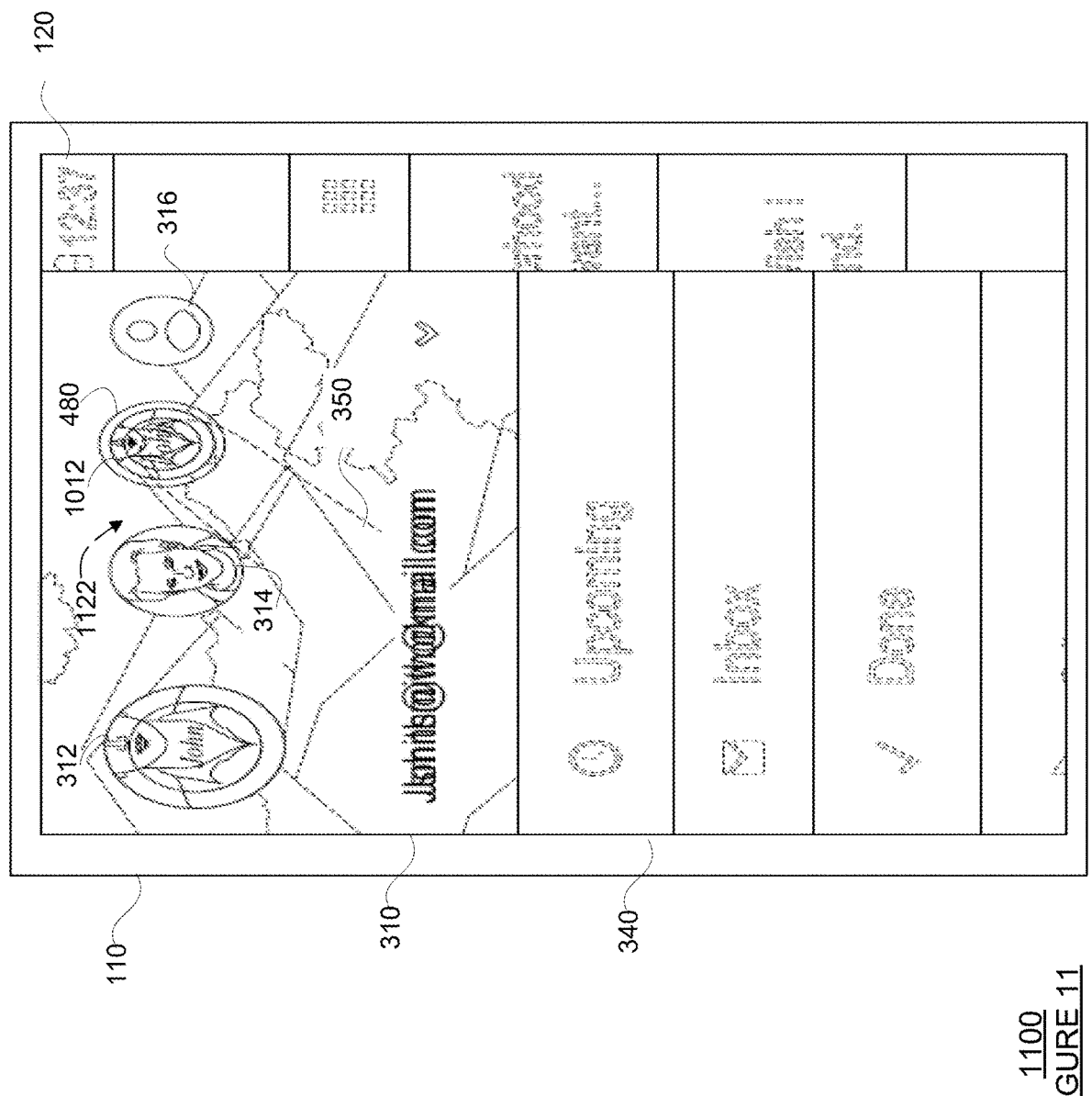
FIG. 11 is another example of the transitional stage in accordance with aspects of the disclosure.
Figure 12:
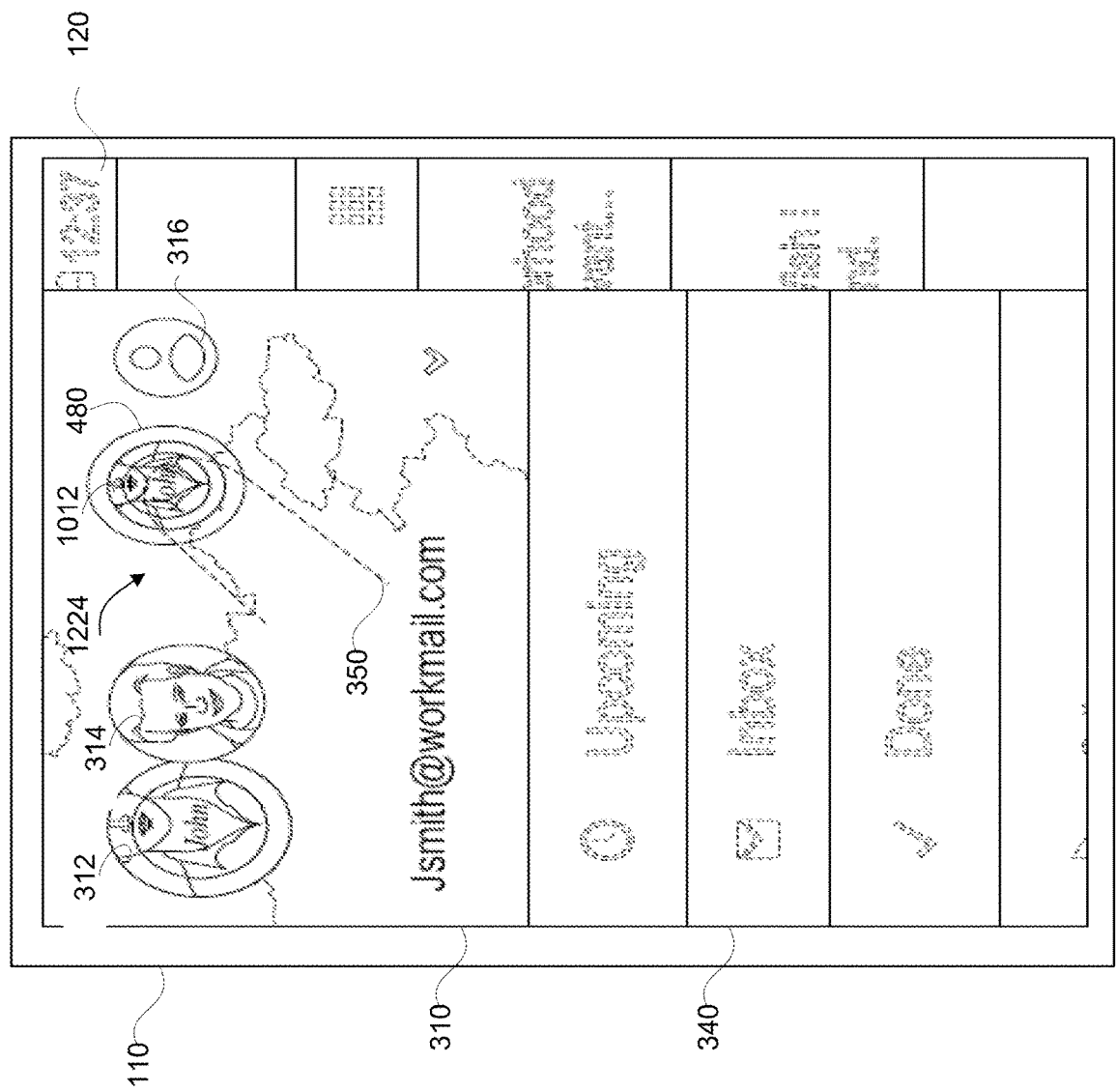
FIG. 12 is an example of a completed background transition in accordance with aspects of the disclosure.
Figure 13:
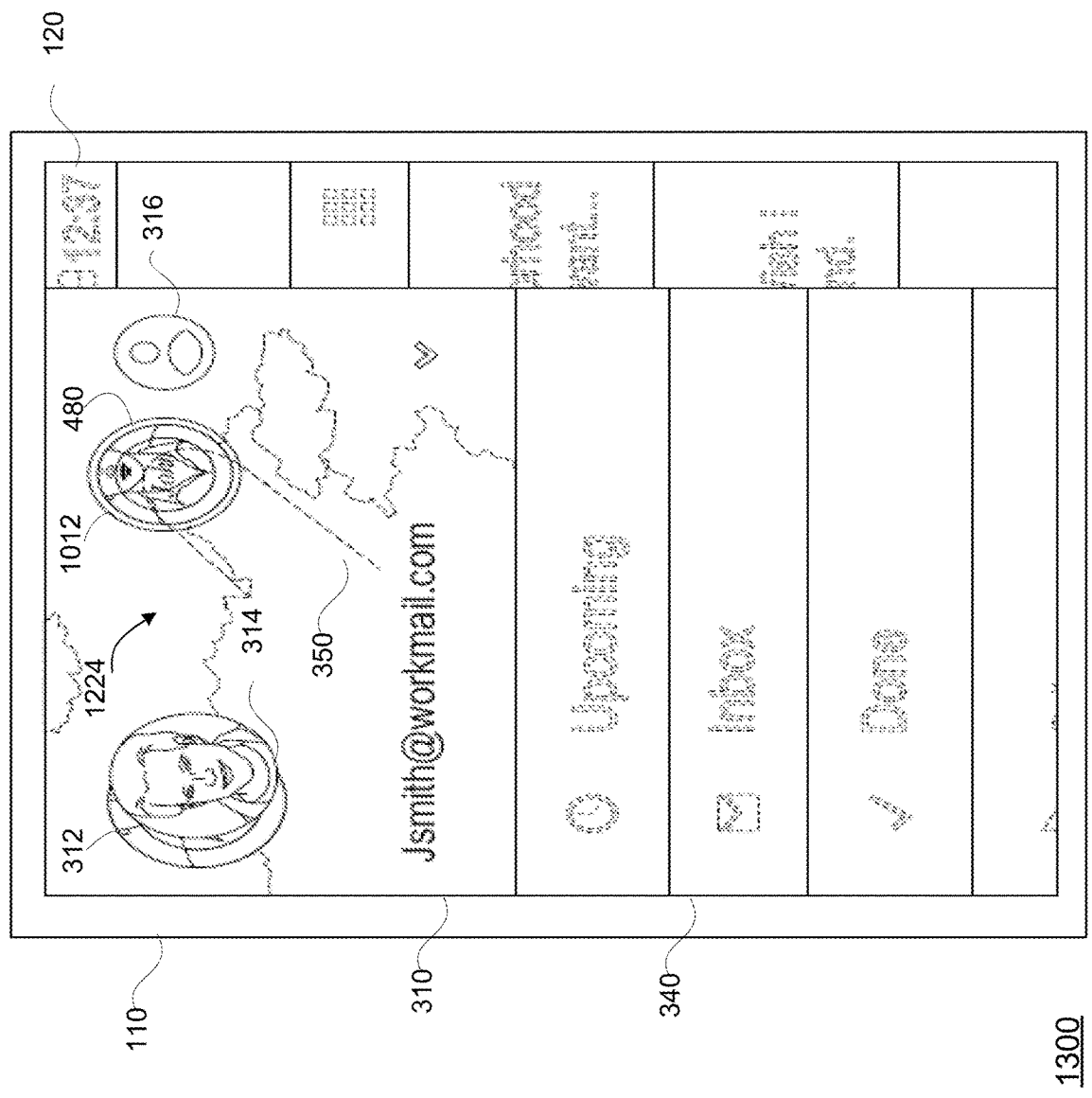
FIG. 13 illustrates an almost completed transitional stage in accordance with aspects of the disclosure.
Figure 14:
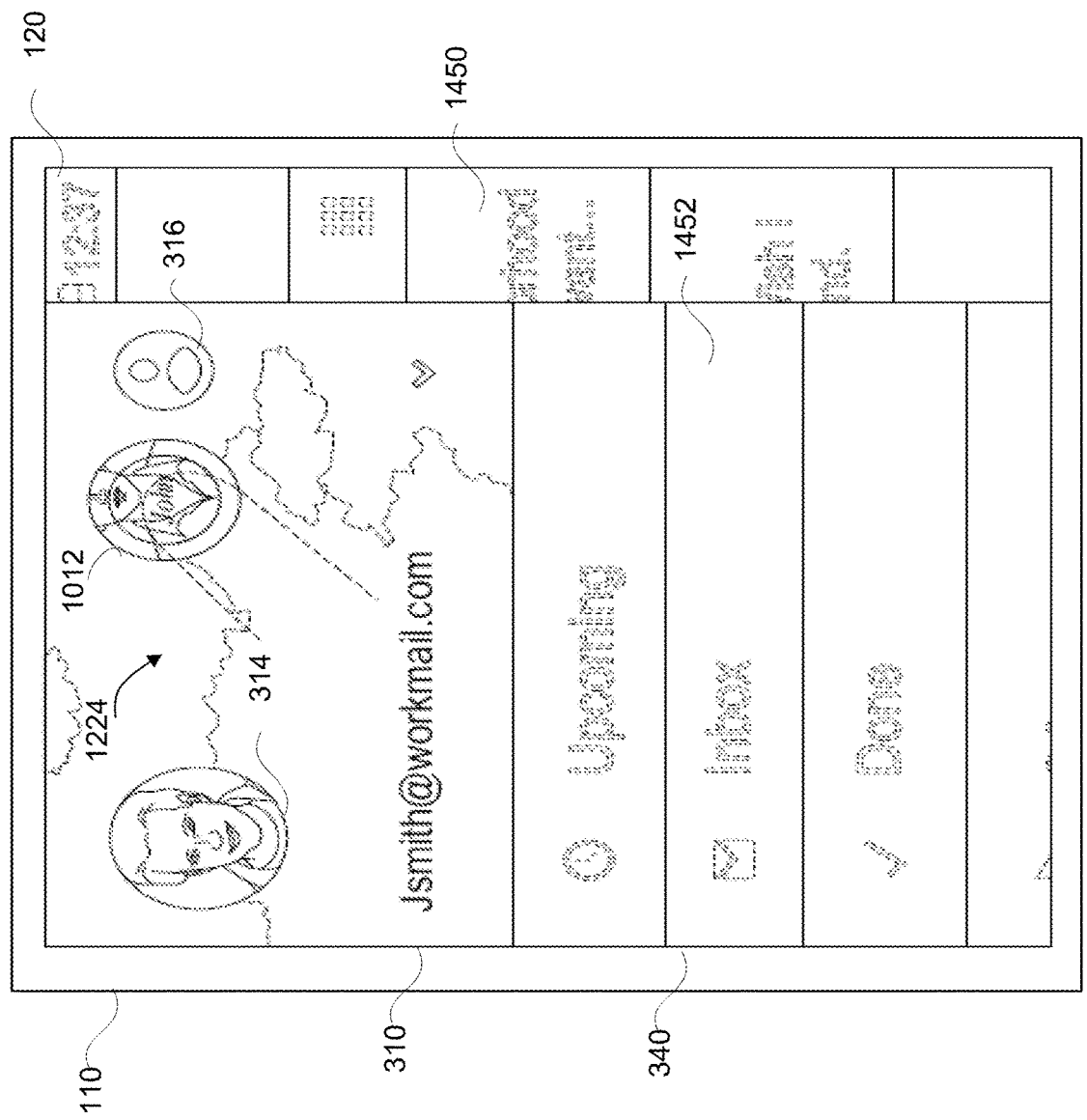
FIG. 14 is an example of a completed transition of user accounts in accordance with aspects of the disclosure.

Similar to the transitional stage from the swiping motion described above, indicators 312 and 314 may transitionally switch positions. In this regard, FIGS. 10-13 illustrate the gradual transition of the graphics as indicator 314 takes the original place of indicator 312. Specifically, FIGS. 10-13 show the movement of indicator 314 to the position of indicator 312, the transition of the background, and the new e-mail address associated with indicator 314, all of which was discussed above with respect to the swiping motion. When the user performs the tapping motion instead of the swiping motion, however, the carousel motion may not occur. Rather, as shown in FIGS. 10-13, the selected indicator may simply move directly to the main position. In addition, the indicator in the main position takes the place of the selected indicator. For example, as shown in FIGS. 10-12, indicator 1012 appears which represents indicator 312 transitioning to a new location, while indicator 314 gradually moves toward the location of indicator 312. Indicator 1012, however, may simply be a representation of indicator 312 during the transition, and should not be considered as a second indicator to represent the same user account. Rather, the transition may last only seconds or fractions of a second, so the appearance of indicator 1012 is simply to act as a placeholder for indicator 312 once the transition is completed. It is understood that the transition may last any amount of time, however. Finally, as shown in example 1400 of FIG. 14, indicators 312 and 314 fully switched positions.

Furthermore, transition background 1122 in example 1100 of FIG. 11 illustrates the transitioning of the mountainous background associated with indicator 312 to the sky and cloud background associated with background 314. Background 1224 of FIGS. 12-14 signifies the final sky and cloud background after the transitional stage in FIG. 11 is completed.

When the transition is completed, the user account details and settings associated with indicator 314 may be displayed. The location of indicator 314 is the main position that, as described above, indicates which user account details are currently being displayed in the e-mail application. Thus, the background of top portion 310 and the e-mails contained in the various links and folders of bottom portion 340 are associated with the user account of indicator 314. For example, when the user selects the inbox in bottom portion 340, the e-mails in the inbox will only be the e-mails associated with the indicator 314. In addition, it should be understood that any position on the screen may be considered the main position that indicates which details of the respective indicators are displayed.

Once the user account switches, the user may use the functions of the e-mail application as shown in bottom portion 340. For example, the user may click on the inbox to display their received e-mails. As one example, when the user clicks on the inbox, the received e-mails in the inbox may be displayed on a separate screen. In this regard, the separate screen may be considered an inbox screen, and the screen with the multiple indicators that the user can switch from may be considered the home screen. On the inbox screen the e-mail application may show the headings of the received e-mails to the user. In this regard, the screen may not be partitioned between a top and bottom portion.

To revert back to the home screen from the inbox screen, the user may select an options menu. For example, the user may select the options menu by selecting a button displayed on the inbox screen. As another example, the user may open the options screen by swiping their finger from one end of the display to the opposite end of the display. For instance, the user may swipe their finger from the left end of the display to the right end. When this occurs, the home screen may appear either concurrently or after the finger swipes from the end of the screen. As illustrated in example 1400 of FIG. 14, the inbox screen 1450 is now only partially displayed behind home screen 1452.

Once the home screen is in front of the inbox screen, the user is able to switch back to the inbox screen by clicking on any portion of the inbox screen. For example, the user may click, either through the touch screen display or by using a cursor and mouse, any portion of inbox screen 1450. Once the user selects any portion of inbox screen 1450, the inbox screen 1450 will re-appear and the home screen 1452 will disappear. The user is able to open the home screen again by performing the functions described above.

Figure 15:
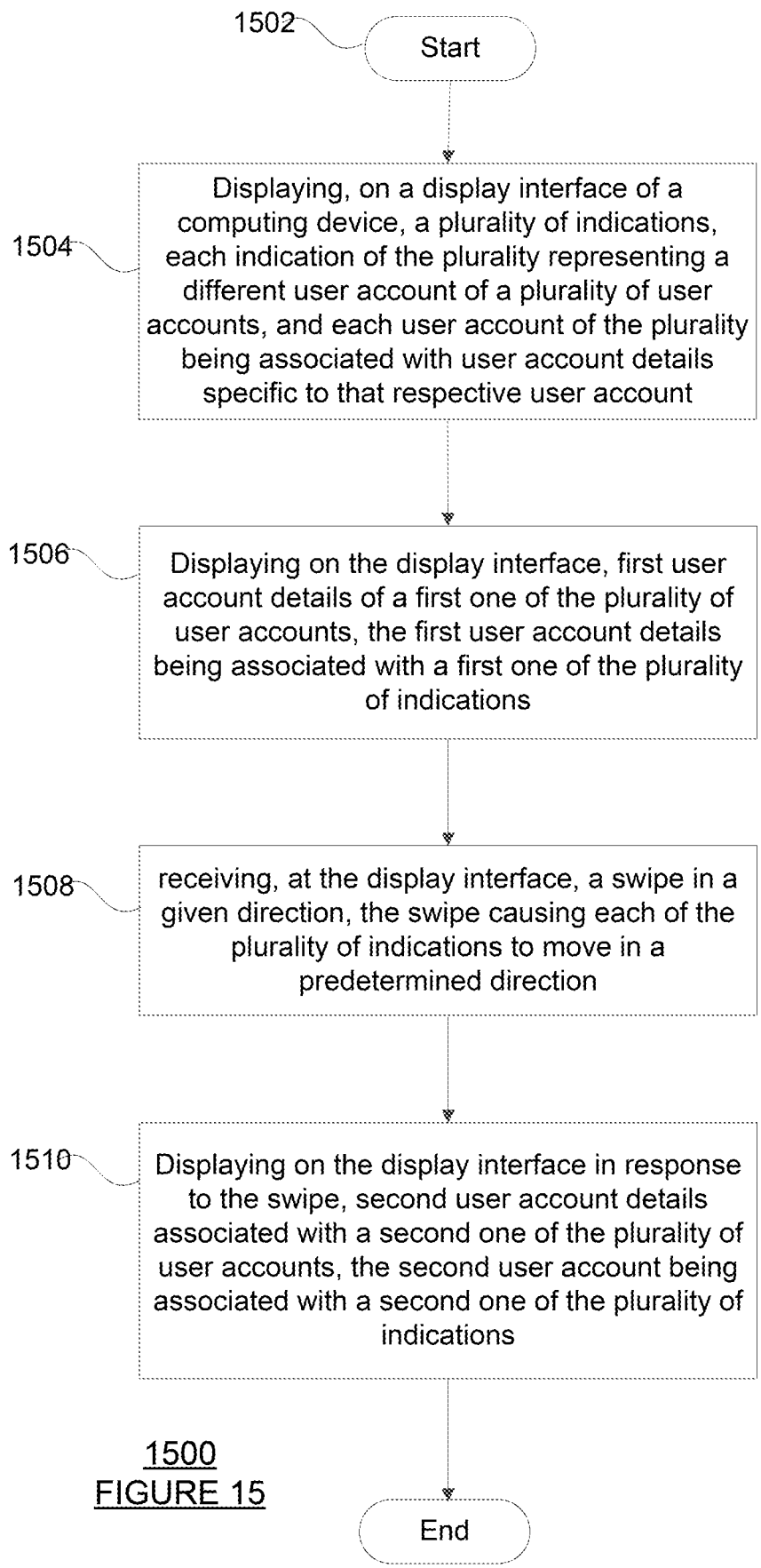
FIG. 15 is an example flow diagram in accordance with aspects of the disclosure.

FIG. 15 is an example 1500 flow diagram of some aspects that were described above, which may be performed by one or more computing devices, such as client computing devices 110, 130, 140, or 150. In this example, the process begins at block 1502. At block 1504, a computing device displays, on an interface, a plurality of indications, each indication of the plurality representing a different user account of a plurality of user accounts, and each user account of the plurality being associated with user account details specific to that respective user account. Then, at block 1506, the computing devices display first user account details of a first one of the plurality of user accounts, the first user account details being associated with a first one of the plurality of indications. At block 1508, the computing device then receives on the interface, a swipe in a given direction, the swipe causing each of the plurality of indications to move in a predetermined direction. As noted above, in one example the indications may move in a carousel-type manner. Finally, at block 1510 and in response to the swipe, the computing devices display second user account details associated with a second one of the plurality of user accounts, the second user account being associated with a second one of the plurality of indications. A background associated with the second indication may replace a background that was previously displayed concurrently with the first user account.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   detecting, at a computing device, a directional action by a user of the computing device;
   determining, by one or more processors of the computing device, that the directional action is associated with a first user account of a plurality of user accounts, wherein a representation of the first user account and a representation of a second user account are concurrently presented on a selected region of a display of the computing device, and the first and second user account representations move within the selected region in a predetermined direction in accordance with the directional action;

in response to the determining that the directional action is associated with the first user account:

switching, by the one or more processors, a. login associated with the first user account to a login associated with a second one of the plurality of user accounts; and transitioning, in the selected region of the display, from the first user account representation to the second user account representation, the second user account representation identifying the second user account.

2. The method of claim 1, wherein the directional action is a gesture in which at least a portion of a hand of the user hovers over the display.

3. The method of claim 1, wherein the directional action is a swipe across the display.

4. The method of claim 1, wherein the directional action is a tap on the display.

5. The method of claim 1, wherein transitioning from the first user account representation to the second user account representation includes replacing a first background associated with the first user account with a second background associated with the second user account.

6. The method of claim 5, wherein replacing the first background with the second background includes fading away the first background upon replacement with the second background.

7. The method of claim 5, wherein replacing the first background with the second background includes changing a color of at least one of the first background or the second background during the transitioning.

8. The method of claim 5, wherein replacing the first background with the second background includes moving the first background across the display in accordance with the detected directional action.

9. The method of claim 1. wherein the first user account representation is a graphical representation corresponding to a user of the first user account, and the second user account representation is a graphical representation corresponding to a user of the second user account.

10. The method of claim 1, wherein the first user account representation indicates a type of the first user account, and the second user .account representation indicates a type of the second user account.

11. The method of claim 1, further comprising accessing an application according to user account details of the second user account.

12. The method of claim 11, wherein the application is selected from the group consisting of an e-mail application, a text document application, a game, a mapping application, and a cloud storage application.

13. The method of claim 12, wherein the application is the e-mail application, and switching the login causes the e-mail application to switch e-mail accounts from the first user account to the second user account.

14. A computing device, comprising:

a display interface configured to display a plurality of user account representations and to present information to a user of the computing device regarding an application executable by the computing device;

an input interface configured to receive a directional action from the user:

memory configured to store instructions and data of the computing device, including user account information for at least first and second ones of the plurality of user account representations for the application, the first user account representation being associated with a first one of a plurality of user accounts associated with the application and the second user account representation being associated with a second one of the plurality of user accounts associated with the application; and one or more processors operatively coupled to the display interface, the input interface and the memory, the one or more processors being configured to use instructions and data stored in the memory to:

determine that the directional action is associated with the first user account;

concurrently present the at least first and second ones of the plurality of user account representations on a selected region of the display interface, wherein the at least first and second ones of the plurality of user account representations move within the selected region in a predetermined direction in accordance with the directional action; and in response to determination that the directional action is associated with the firstuser account:

switch a login associated with the first user account to a login associated with the second user account; and cause a transition, in a selected region of the display interface, from the first user account representation to the second user account representation.

15. The computing device of claim 14, wherein the directional action is a gesture in which at least a portion of a hand of the user hovers over the display interface.

16. The computing device of claim 15, wherein the input interface includes a camera arranged to detect the gesture.

17. The computing device of claim 14, wherein the directional action is either a swipe across the display interface or a tap on the display interface.

18. The computing device of claim 14. wherein the one or more processors are further configured to access the application according to user account details of the second user account.

19. The computing device of claim 18, wherein, upon accessing the application, the one or more processors are further configured to cause a camera of the computing device to record a video stream.

20. The computing device of claim 14, wherein the transition from the first user account representation to the second user account representation includes replacement of a first background associated with the first user account with a second background associated with the second user account.

* * * * *